United States Patent
Levitan (10) Patent No.: US 7,590,245 B1
(45) Date of Patent: Sep. 15, 2009

(54) ANONYMOUS COMMUNICATING OVER INTERCONNECTED NETWORKS

(76) Inventor: Gutman Levitan, 101 Grove St., Apt. 11, Stamford, CT (US) 06901

( * ) Notice: Subject to any disclaimer, the term of this patent is extended or adjusted under 35 U.S.C. 154(b) by 0 days.

(21) Appl. No.: 12/283,021

(22) Filed: Sep. 10, 2008

(51) Int. Cl.
*H04K 1/00* (2006.01)
*H04L 29/06* (2006.01)

(52) U.S. Cl. .......................... 380/255; 726/12; 713/160

(58) Field of Classification Search ................. 380/255, 380/239, 264, 267, 268, 269, 33, 282; 726/2, 726/12, 13, 14, 15, 26, 30; 713/153, 154, 713/160, 161, 162, 168; 709/239, 240, 241, 709/242, 243, 244; 725/31
See application file for complete search history.

(56) References Cited

U.S. PATENT DOCUMENTS

| | | | | |
|---|---|---|---|---|
| 6,389,533 B1 * | 5/2002 | Davis et al. | ................. | 713/162 |
| 6,591,291 B1 * | 7/2003 | Gabber et al. | ............... | 709/206 |
| 6,952,769 B1 * | 10/2005 | Dubey et al. | ................. | 713/153 |
| 7,171,493 B2 * | 1/2007 | Shu et al. | ..................... | 709/246 |
| 2006/0072565 A1 * | 4/2006 | Yazaki et al. | ............... | 370/389 |
| 2006/0170963 A1 * | 8/2006 | Aoki | ......................... | 358/1.15 |
| 2007/0091893 A1 * | 4/2007 | Yazaki et al. | ............... | 370/392 |
| 2008/0037546 A1 * | 2/2008 | Ishikawa et al. | ............ | 370/392 |

* cited by examiner

*Primary Examiner*—Eleni A Shiferaw
(74) *Attorney, Agent, or Firm*—Ilya Zborovsky (57) ABSTRACT

A method and system for concealing from an outside observer the source and destination of information transmitted over computer network. Two types of data packets are defined: content packets that are carrying application data, i.e. real information, and announcement packets that are carrying data providing delivery of content packets. A flow number is assigned to a flow of packets carrying specific application data from a source host to a destination host and the number is included in the content packet header instead of the source and destination addresses. Applying public/private key encryption to announcement packets, which are delivered according to the standard IP protocol, a network server provides the flow number to the source and destination hosts and each router along the path between them, thereby building an anonymous virtual circuit for delivery of application data.

7 Claims, 6 Drawing Sheets

| Version | IHL | Type of service | Total length | |
|---|---|---|---|---|
| Identification | | | Flags | Fragment offset |
| Time to live | | Protocol | Header checksum | |
| Source address | | | | |
| Destination address | | | | |
| Options/padding | | | | |

Conventional IP header of announcement packet

Fig. 3a

| | | | | |
|---|---|---|---|---|
| 0 | | 16 | | 31 |

| Version | IHL | Type of service | Total length ||
|---|---|---|---|---|
| Identification ||| Flags | Fragment offset |
| Time to live || Protocol | Header checksum ||
| Flow number |||||
| Null |||||
| Options/padding |||||

Modified IP header of content packet

Fig. 3b (a) | In Port | Flow Num | Priority | Out Port | MAC Addr |

(b) | In Port | In Flow Num | Priority | Out Flow Num | Out Port | MAC Addr |

(c) | In Port | In Flow Num | Priority | Out Flow Num | Out Port | MAC BA |

ANONYMOUS COMMUNICATING OVER INTERCONNECTED NETWORKS

FIELD OF THE INVENTION

This invention relates to the field of computer networks and, more specifically, to an aspect of network security referred as anonymity of communications or privacy protection. The Internet is a global network comprising numerous interconnected computer networks.

BACKGROUND OF THE INVENTION

Confidential or sensitive information transmitted over the Internet is protected by some form of encryption. It may also be desired to conceal from an outside observer the fact of communication itself. For example, companies that want to keep their research interests secret would like to prevent outsiders from knowing which web sites they are visiting. In such cases anonymity of communications becomes an issue.

The problem of privacy and anonymity stems from Internet Protocol (IP). According to the protocol, information is transmitted in packets and source and destination addresses are placed in the header of each packet. As a result, an interceptor may trace data exchange between parties of interests, which makes any communicating party an easy target of malicious actions ranging from eavesdropping to denial of service (DOS) attack.

Virtual private network (VPN) is an area where privacy via anonymity is an integral part of security. VPNs are utilizing the existing Internet infrastructure for some or all of their communications as an alternative to building the expensive dedicated networks of their own. VPNs are particularly cost effective for small companies and for companies of all sizes with highly mobile workforce. However they inherently expose themselves to security risks. The Internet is intentionally open and therefore unsecured because it is available to everybody from general public to businesses to government agencies and non-profit organizations. This openness leaves the Internet vulnerable and those private networks that use Internet connections expose themselves to attacks via the Internet.

Proliferation of wireless and mobile connections to the Internet contributes to the privacy problem revealing the location of communicating party. In particular, WiFi networks carry the potential for revealing more precise location compared to other technologies such as cell phones or pagers because they operate with smaller cell sizes. Small cell sizes help WiFi networks to maintain signal quality and higher communication bandwidth at lower power levels and in environments that have poor signal propagation.

A solution to privacy problem is an intermediate server interposed between sender and receiver so that receiver sees only IP address of the intermediate server. The server however could be compromised. One way to deal with this risk is to spread the trust among multiple servers. David Chaum in an article "Untraceable electronic mail, return addresses, and digital pseudonyms", Communications of the ACM, 24, 2 (February 1981), proposed a system for anonymous electronic mail which employs a set of forwarding agents called mixes. Each mix collects a few messages, waits some time and then sends the messages out in a different order. Mixes are meant to prevent eavesdroppers from tracing messages passing through them and thus provide sender and receiver unlinkability. The strength of mixes is that even if only one mix in a path is not compromised, the system continues to provide sender-receiver unlinkability.

In a decentralized peer-to-peer (P2P) environment, another anonymity technique, called "crowds", is employed. According to this technique, browsers on client machines can "join the crowd" and become candidates for routing traffic from and to other browsers. The privacy protection relies on the large number of browser routers in the crowd and on the fact that any browser could be either the initiator of a request or just a router.

A drawback of approach based on a centralized trusted server is that all network traffic goes through the server and as a result, the server may become a "bottleneck" in the network. A drawback of decentralized crowd-style approach is that there may not be a firewall between browser routers. This limitation can severely compromise the security of client systems.

U.S. Pat. No. 6,266,704 to Reed et al. discloses a virtual circuit (pathway) that provides anonymous connection for moving data through a communication network. The virtual circuit comprises a plurality of "onion routers" wherein each router is responsive to an "onion", which is a layered data structure with one layer per router and wherein each layer contains an encrypted identity of the next router in the pathway.

U.S. Pat. No. 6,389,533 to Davis et al. teaches an e-mail system that encrypts the return address with a public key of the recipient system and places the encrypted address in the outgoing message. U.S. Pat. No. 6,591,291 to Gaber et al. describes an e-mail system that employs the destination address to generate an alias source address that substitutes for the real source address in e-mail message. This renders the sender anonymous while providing it with ability to receive a reply to the message.

U.S. Pat. No. 6,952,769 to Dubey et al. describes a protocol for anonymous communication between two entities across a network using pseudonyms instead of physical addresses and distributing trust among agents (servers) so that an identity of communicating party is not revealed by the compromise of any one agent involved in the execution of the protocol, and wherein the probability of identity compromise is a polynomial function of, which means less than proportional to, the number of compromised agents.

U.S. Pat. No. 6,986,036 to Wang et al. discloses a scheme for protecting anonymity of a client when it communicates with a target server over the Internet. A plurality of Web servers is randomly selected from a pool of participating Web servers for use as routers in a routing chain between the client and the target server. To prevent traffic analysis, the "onion encryption" is applied to the messages transmitted along the routing chain. When a client intends to communicate with a target server, it sends a request for a secure routing chain to a trusted routing control server.

U.S. Pat. No. 7,124,172 to Hirayama describes a method of processing an inquiry from a user to a company web site without having the user to reveal his or her personal information. The method uses an intermediate relaying system that replaces user information with a number attached to the inquiry.

U.S. Pat. Nos. 7,133,930 to Munger et al. and 7,188,180 to Larson et al. describe a new agile routing protocol that is built on top of IP. According to the protocol, packet's final destination is concealed behind layers of encryption and each router can remove only the outer layer of encryption to reveal the next router. As a result, final destination of data cannot be determined from an intercepted packet. The secure "virtual Internet" works over the existing Internet infrastructure, and interfaces with client applications the same way as the existing Internet.

U.S. Pat. No. 7,171,493 to Shu et al. teaches a method and devices for splitting a file into a plurality of message segments and addressing the segments to a plurality of addresses assigned to a receiving host in order to camouflage the content and pattern of network traffic, increase the difficulty of interception and provide resistance to denial-of-service attack. U.S. Pat. No. 7,185,204 to Narayanaswani et al. describes a method and system for providing location privacy by assigning a pool of addresses with which a user can access a network over a mobile computing device.

U.S. Pat. No. 7,246,231 to Tariq et al. discloses a routing system that encrypts the subnet prefix of IP address, so that any entity, which does not know the encryption key, would not be able to determine the IP address.

U.S. Pat. No. 7,257,646 to Jonsson describes a method and system for handling traffic from a source node to a destination node via selectable relay nodes that form an overlay network of nodes managed by an independent operator. Along with quality of service the overlay network provides address substitution to prevent an interceptor from relating a packet to a specific original source or final destination.

U.S. Pat. No. 7,398,388 to Xu at al. discloses a "crowd-style" method of increasing user privacy in P2P environment, which is combined with "onion-style" encryption.

Published application Ser. No. 11/009,399 of LeMay at al. discloses a secure e-mail protocol comprising two sub-protocols—a message transport protocol and a key management protocol, which operate in tandem to enhance security. The protocol employs an existing infrastructure to transport encrypted e-mail messages, and a key server for management and distribution of encryption keys in key packets. The message transport protocol relies on a group addressing scheme to obscure individual sender and recipient identities.

SUMMARY

In the prior art, privacy via anonymity is provided by means of substitution and/or encryption of IP addresses but the addresses are still there and potentially could be figured out in one way or other. It is a main object of the present invention to provide a stronger anonymity by moving information in packets that do not have source and destination addresses in the packet header or anywhere in the packet.

In keeping with this object and with others, which will become apparent hereinafter, the present invention consists, briefly stated, in a method and system for concealing from an outside observer the source and destination of information transmitted over a computer network by using two types of data packets: content packets that are carrying application data, i.e. real information, and announcement packets that are carrying data providing delivery of content packets. A flow number is assigned to a flow of content packets carrying a specific message or other kind of application data from a source host to a destination host and the number is included in the packet header instead of the source and destination addresses. Applying public/private key encryption to announcement packets, which are delivered according to IP protocol, a network server provides the flow number to the source and destination hosts and each router along a path between the hosts, thereby building an anonymous virtual circuit for delivery of application data.

The novel features, which are considered as characteristic for the present invention, are set forth in particular in the appended claims. The invention itself, however, will be best understood from the following description of specific embodiment when read in connection with the accompanying drawings.

DESCRIPTION OF THE PREFERRED EMBODIMENTS

Figure 1:
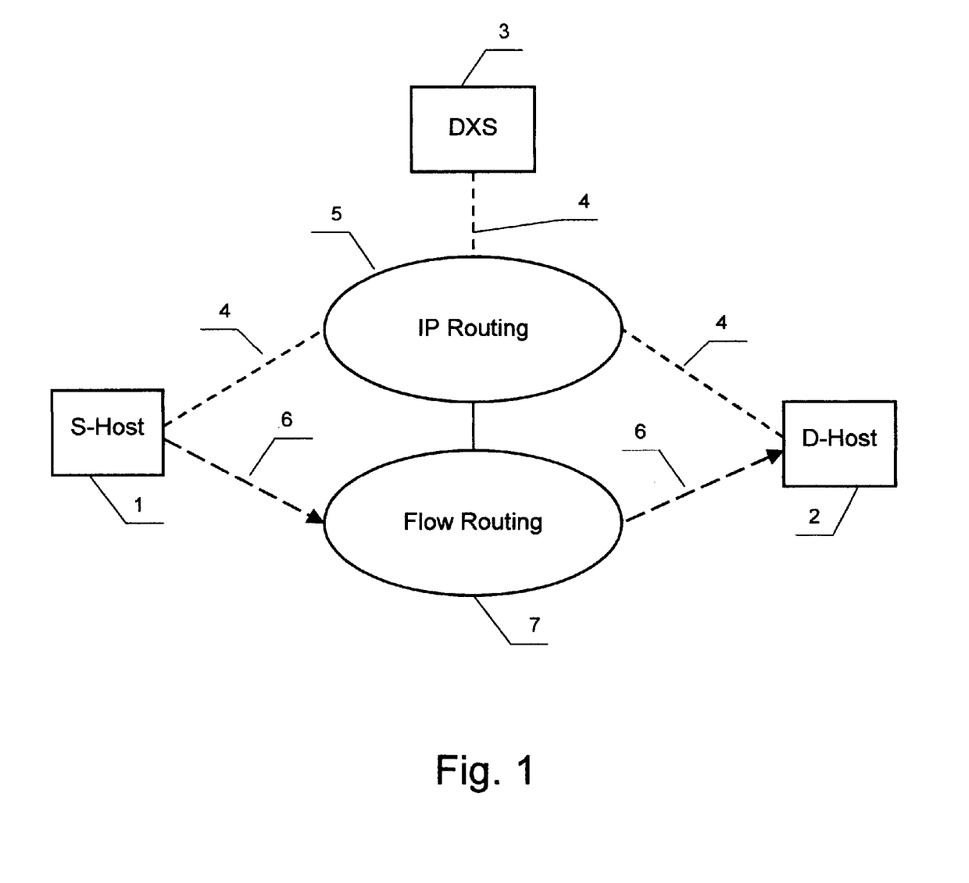
FIG. 1 illustrates anonymous communication according to the present invention.

The anonymous communication according to the present invention is illustrated by FIG. 1. When a source host 1 is going to send a message to a destination host 2 it sends a request to a data exchange server 3. The request is encrypted, encapsulated in an announcement packet or packets 4 and delivered according to the standard Internet Protocol (IP) over a sequence of routers selected among IP routers 5. When the destination host 2 is going to get some information from the host 1, it sends a similar request to the server 3. In both cases the server 3 builds an anonymous virtual circuit between the hosts 1 and 2 for transmission of application data encapsulated in content packets 6.

The server 3 assigns a randomly chosen flow number to each flow of content packets carrying a specific message or other kind of application data from the source host to the destination host and the number is included in the content packet header instead of the source and destination addresses. The virtual circuit comprises a sequence of routers selected among flow routers 7. The server builds the circuit by selecting a pass for the flow and providing the flow number to the source and destination hosts and each router along the selected path.

The association of flow number with particular network nodes is concealed from an outside observer by means of public/private key encryption known in the art. The flow number is included in notifications sent to hosts and routers in announcement packets. The notifications are encrypted by public keys of devices they are directed to, thereby enabling only the intended hosts and routers to decrypt the notifications using their private keys, extract the flow number and provide delivery of packets with the flow number in the packet header from the source host to the destination host without revealing the source and destination addresses.

Thus the system operates with two routing protocols—the standard IP protocol for delivery of announcement packets and a flow routing protocol for delivery of content packets. The content packets are carrying application data, i.e. real information, over anonymous virtual circuits. Announcement packets are carrying a kind of metadata that is used by the data exchange server for building virtual circuits.

Router may be a stand-alone dedicated device from a vendor such as Cisco Systems, or a computer with network interface cards (NICs) running a network operating system like Novel NetWare, Sun Microsystems's Solaris or Microsoft Windows 2000. A hardware-based router called "layer 3 switch" uses application-specific integrated circuits (ASICs) and network processors to improve routing performance. Flow routers can be implemented as additional software installed on existing IP routers or as separate routers. In other words, any router on the network may be either an IP only router or a flow router or a two-protocol router.

Figure 2:
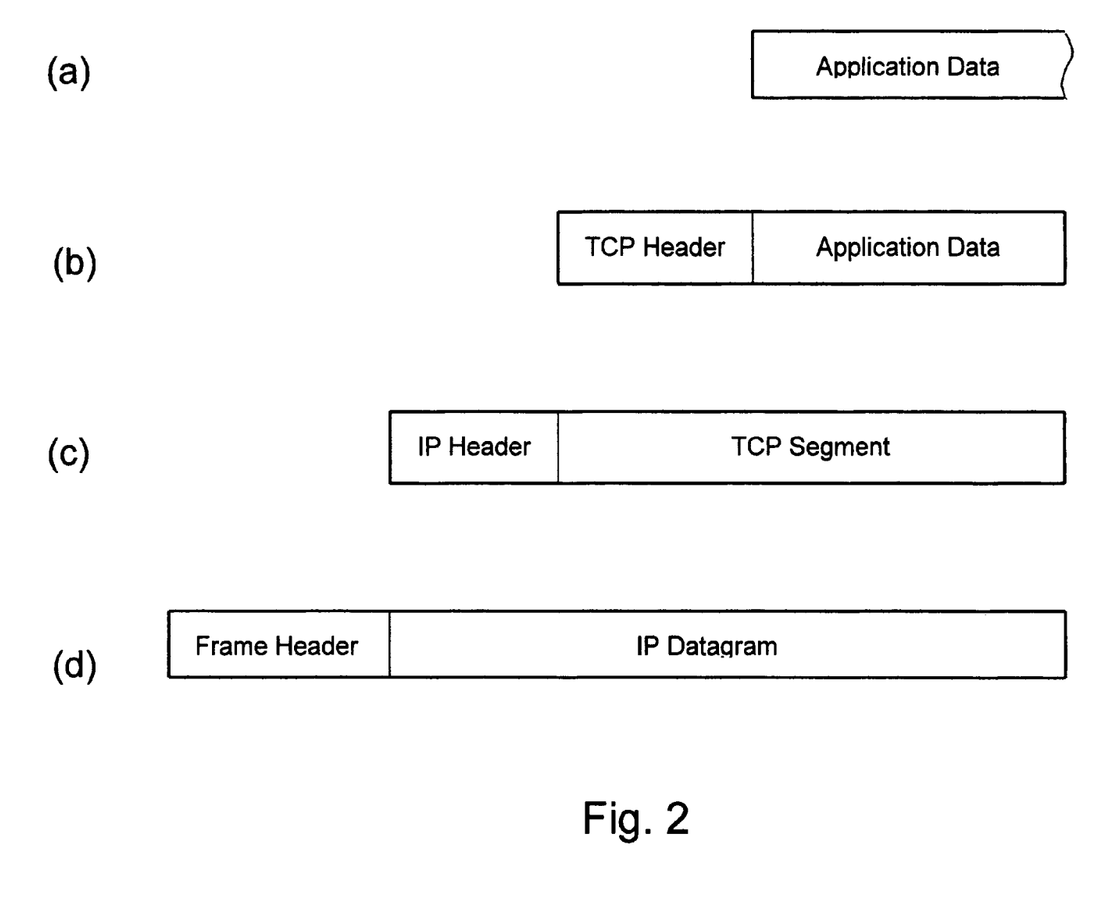
FIG. 2 illustrates the layered Internet protocol.

Internet protocol, known as TCP/IP, has five layers: application layer, transport layer, network layer, data link layer and physical layer. (The layered system, originated in an international standard known as ISO OSI reference model, was designed to provide interoperability and independence from hardware and software platforms.) On the transmitting side, data is relayed from the highest application layer to the lowest physical layer by adding a header for each layer (FIG. 2). At the receiving side, a packet is processed sequentially from the lowest physical layer to the highest application layer.

A data stream from the application layer (FIG. 2a) is fragmented into parts in the transport layer (FIG. 2b), and the parts are encapsulated into Transmission Control Protocol (TCP) segments. TCP is responsible for data exchange between applications run on different computers. It is a connection-oriented protocol that provides flow control and guaranteed error-free data delivery. In the network layer (FIG. 2c), TCP segments are encapsulated into Internet Protocol (IP) datagrams. IP is responsible for end to end packet delivery across multiple router-connected networks. Its primary task is to support internetwork addressing and packet forwarding. In the data link layer (FIG. 2d), IP datagrams are encapsulated into Ethernet frames or ATM cells to be transmitted over a physical medium, i.e. physical layer.

Figure 3A:
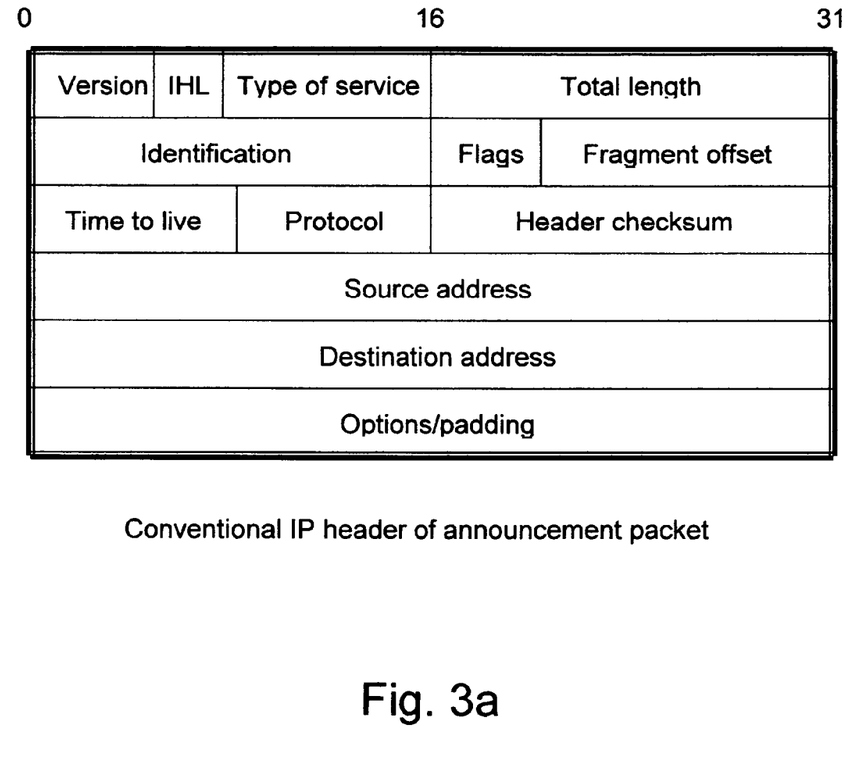
FIG. 3a shows a layout of IP packet header.

The network layer and partly data link layer are only layers relevant for the present invention although, as it could be seen from the prior art, special anonymity arrangements could be implemented on application level as well. Routers process IP datagram header shown in FIG. 3a. Along with the source and destination addresses the header specifies a protocol version number, a header length, packet fragmentation and reassembly information, maximum number of routers to pass, an error-checking value and other data. (Full information can be found in RFC 791 "Internet Protocol", September 1981).

There are two schemes of network addressing: one in the data link layer and other in the network layer. In the data link layer, each network node has a Media Access Control (MAC) address that is hardwired into network interface card (NIC). To make it globally unique, the 48-bit address is divided into two parts: the first 24 bits are assigned to a manufacturer and the last 24 bits are assigned by the manufacturer to a NIC.

In the network layer, an IP address is a combination of a network address and a node address within the network. The address is a 32-bit binary number divided into four 8-bit fields and contain two pieces of information: the left fields identify a network, i.e. a group of computers, and the right fields identify a host, i.e. a computer on the network. The 32-bit binary values are presented in a dotted-decimal notations like 182.16.3.24 for human convenience. For small number of large networks with many hosts, one 8-bit field is used as the network address and three fields are used as the host address. For large number of small networks with not many hosts, three fields are used as the network address and one field as the host address.

Both MAC and IP addresses have a value—all binary 1s—for the broadcast address, which is used for sending a message simultaneously to all nodes on the network. Broadcast messages are sent mainly for network management and diagnostic purposes. IP address 255.255.255.255 is the general broadcast address (decimal 255 fills the 8-bit field with all binary 1s). Routers block the address so that nobody could flood the Internet with a message sent to all computers. The broadcast IP address for a specific network has all 1s in the host portion only. Applications that produce broadcast messages include routing protocols such as RIP.

Figure 3B:
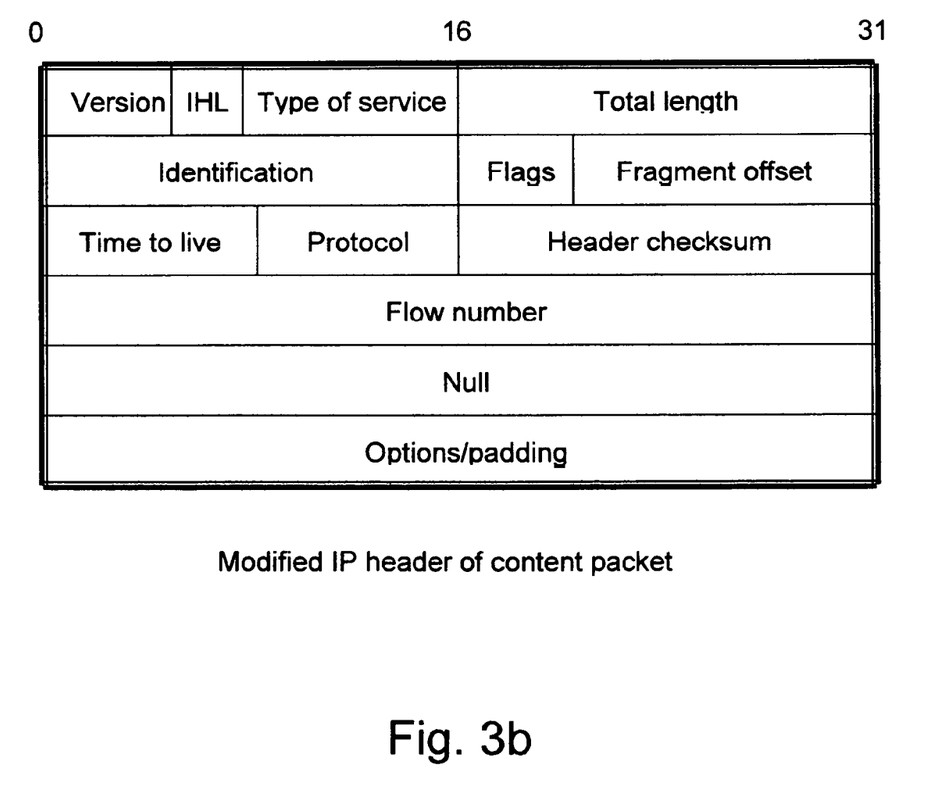
FIG. 3b shows a layout of content packet header.

In the invention preferred embodiment, the layout of content packet header in the network layer is as shown in FIG. 3b. For all other purposes, such as packet fragmentation and reassembly, it is the same as the layout of IP header shown in FIG. 3a but destination address field is nullified by all binary 0s and source address is replaced by flow number. The header is read by flow routers that forward content packets as will be described hereafter.

There are two types of routing over IP networks: hop-by-hop routing to the destination and explicit routing over a predefined pass. In the basic hop-by-hop routing, each router is responsible for determining the next hop, not the complete path. The advantage is that the path may change at any time due to traffic problems or failing links. In the explicit routing, the pass is determined in advance and packets are forwarded without the need to make routing decisions at each router along the pass. The advantages are routing speed and the possibility of traffic engineering, which includes bandwidth management, prevention of routing loops and providing quality of service (QoS) over traffic prioritization.

MPLS (Multiprotocol Label Switching) is the most important Internet protocol of explicit routing that builds virtual circuits across IP networks. MPLS network comprises label-forwarding routers that switch packets and edge devices that determine routes and add labels. When a packet arrives at an ingress edge device, the device looks at the packet IP destination address, determines a pass and attaches a label that will lead the packet over the routers along the pass. The packet then is forwarded by routers, which do not examine IP header but look up their label-forwarding tables. When the packet reaches the egress edge device, the label is removed and the packet is forwarded further on its way via standard IP routing.

While flow forwarding according to the present invention sounds much the same as MPLS label forwarding, the difference is that MPLS uses at the ingress point the packet destination address to determine a pass for the packet. In other words, unlike the method of the present invention, MPLS would not deliver a packet that does not contain a destination address included in the packet. Concealing from an outside observer the source and destination of information by delivering information in packets that do not contain the source and destination addresses is the major point of present invention.

Flow routers store flow-forwarding tables that are controlled by the data exchange server. When the server sets up a virtual circuit, it sends a notification to each flow router along the selected pass with a command to insert table entries for a flow identified by the flow number. After the flow transmission is completed, the server takes down the virtual circuit by sending a notification to each router with a command to delete table entries related to the flow.

When a content packet arrives at a flow router, the router strips the input frame information, retrieves the datagram, reads the packet header shown in FIG. 3b, extract the flow number and looks up its flow-forwarding table. If the flow number is not found in the table, the router drops the packet.

Figure 4:
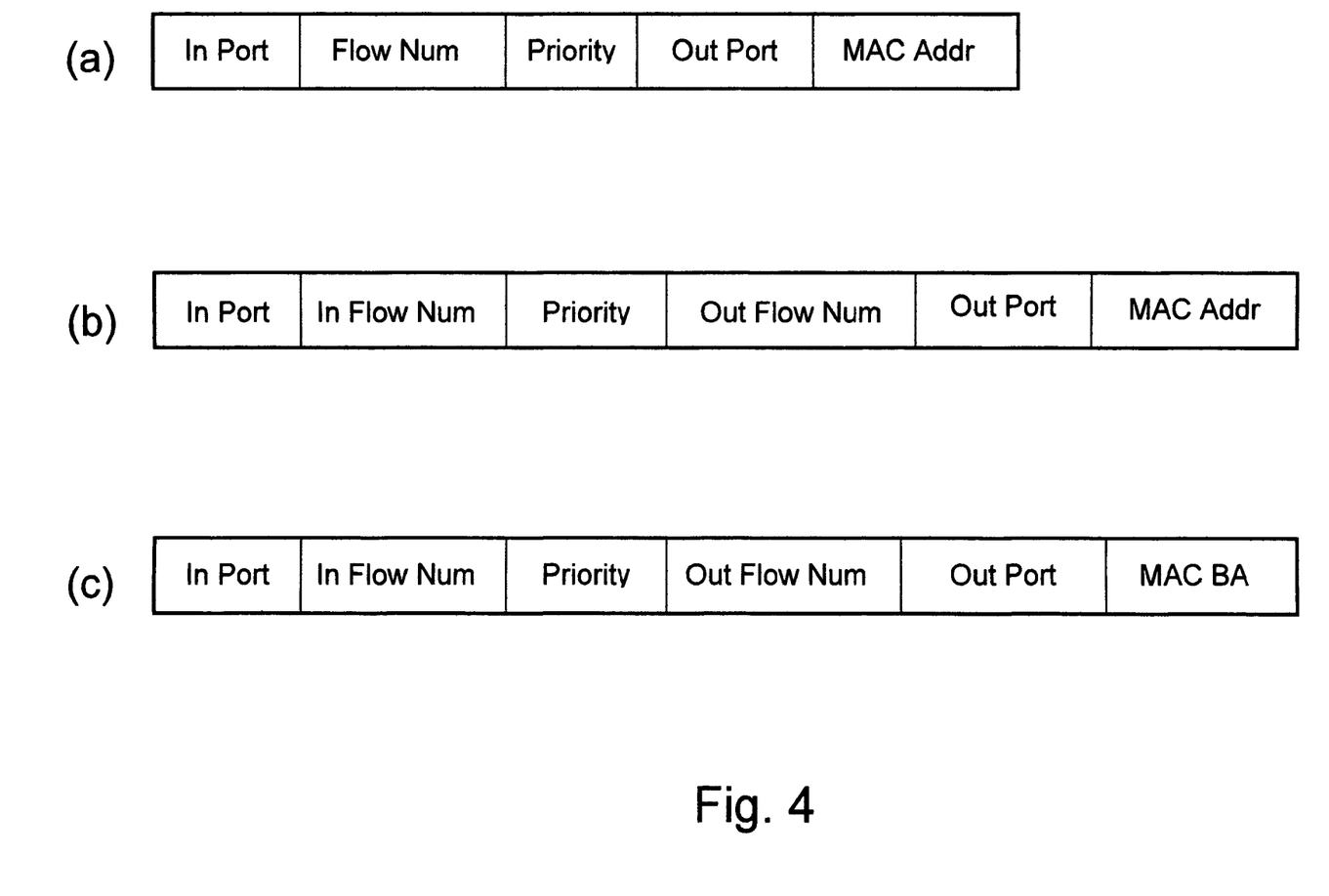
FIG. 4 shows a layout of flow-forwarding table entries.

FIG. 4 shows layouts of the table entry. In one embodiment (FIG. 4a), the entry says that if a packet with the specified flow number arrives at the specified input port, it is to be encapsulated in a frame with the specified MAC address and directed with the specified priority to the specified output port. In other embodiment (FIG. 4b), the router does all of the above and in addition changes the flow number in the input packet to a different flow number in the output packet. As a result, a content packet traveling along the chosen path looks as if it belongs to different flows of application data. The flow hopping makes it harder for an outside observer to trace the path of application data. In still other embodiment (FIG. 4c), the output frame is directed not to MAC address of a particular node but to the broadcast MAC address.

In (a) and (b) embodiments, only one router on a local network receives the packet. In (c) embodiment, all routers on the local network receive the frame at the data link layer but drop the packet at the network layer if the flow number is not found in the flow-forwarding table. Thus only the intended router, provided with an entry for the flow, will forward the packet to the next network.

In (a) and (b) embodiments, each router knows only the local address of next router, not the whole pass. It is similar to the achievement of "onion routing" with its multiple layers of encryption applied to addressing information. In (c) embodiment, no addressing information is available in the flow-forwarding table. Therefore compromised routers do not reveal the pass of application data.

When a content packet with the MAC broadcast address is accepted at the data link layer of unintended node, normally it is filtered out in the network layer or above. In particular, IP routers drop a packet if the packet destination address does not match a range of IP addresses and host firewalls block all "suspicious" packets. Still confusion may not be excluded unless a special filtering arrangement is provided. Keeping this in mind, all networks in an internetwork system, such as the Internet, may be differentiated as participating networks, wherein the filtering arrangement is implemented, and not participating networks, wherein the arrangement is not implemented. Then a content packet will be transmitted over a participating network with the MAC broadcast address and over a not participating network, with the MAC address of intended router or host.

The data exchange server selects a path between the source host and the destination host over a sequence of flow routers using a routing table that is configured either manually or with the help of known in the art routing protocols, such as RIP (Routing Information Protocol), OSPF (Open Shortest Path First) or BGP (Border Gateway Protocol). The protocols are using routing algorithms to gather information about network topology.

The data exchange server sets up a virtual circuit over a selected pass by sending to each router along the pass a notification with a command to insert entries with a flow number in the flow-forwarding table. After the flow transmission is completed, the server takes down the circuit by sending to each router a notification with a command to delete entries with the flow number from the flow-forwarding table. The server also sends notifications to the source host and the destination host. Along with the flow number, the host notifications may include a randomly generated key for encryption (and decryption) of application data. Both the flow number and the key are assigned for one transmission only—next time the same data may be encrypted with a different key and transmitted with a different flow number thereby enhancing the security of communications.

Figure 5:
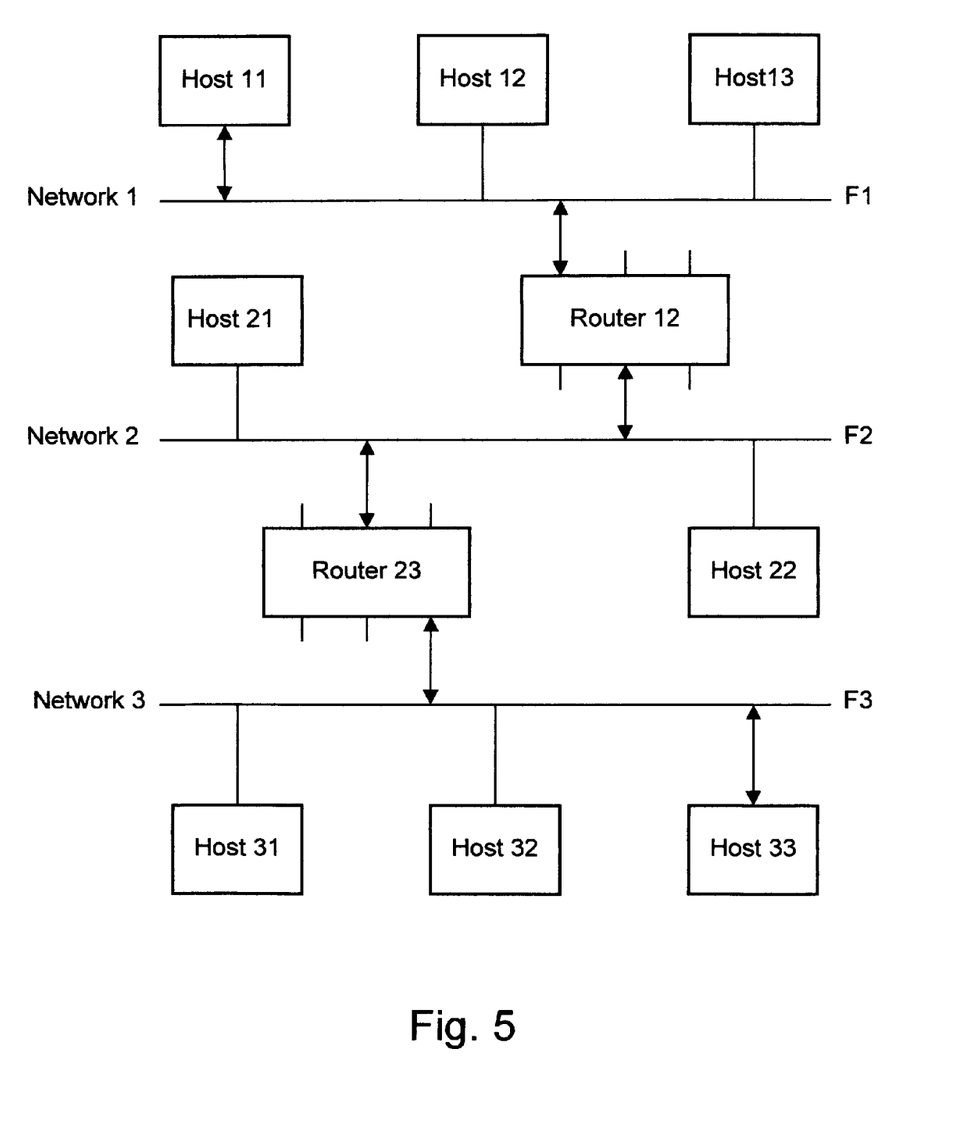
FIG. 5 illustrates flow routing.

FIG. 5 illustrates transmission of application data from a source host 11 to a destination host 33 over routers 12 and 23. The notifications, that are sent by the data exchange server, command the host 11 to transmit a message in packets with the flow number F1, the router 12 to change the flow number from F1 to F2, the router 23 to change the flow number from F2 to F3 and the host 33 to receive packets with the flow number F3. As a result, the same content packet when traversing networks looks like different packets. It makes harder for an outside observer to trace the path of application data.

In addition, the data exchange server may command splitting a large flow of content packets into smaller parts transmitted with different flow numbers so that the parts would look like different flows, making it harder to trace the path of application data, in particular, audio and video streams.

The guaranteed error-free data delivery over the Internet is provided by an acknowledgement mechanism of transport layer protocol. According to TCP, the source host retransmits a packet if the destination host does not acknowledge the reception of the error-free packet. The positive acknowledgement or ACK provides for both packets recovery and congestion control—the sender slows down if ACKs are delayed. In other transport layer protocols built on the top of UDP (User Datagram Protocol), a "negative acknowledgement" or NAK, which is a request for retransmission of lost or corrupted packet, is used for packets recovery only. The data exchange server builds a two way virtual circuit (FIG. 5) by providing two entries for each flow in the flow-forwarding table: one entry for forwarding application data and other for forwarding ACKs or NAKs. As a result, ACKs will follow the same pass as application data but in the opposite direction. They may be transmitted with the same flow numbers as application data or with different flow numbers so to make it more difficult for an outside observer to trace the path.

An important advantage of the present invention is that the data exchange server provides a centralized, and therefore secure management of anonymity while not becoming a "bottleneck" for the network traffic. This is because application data placed into content packets does not go through the server. The server only receives requests from hosts and sends notifications to hosts and routers, and those are short messages. Typically such a message fits in a single announcement packet.

It is preferable that each virtual private network (VPN) would maintain its own data exchange sever. Then dealing with requests and notifications, the server may address not only anonymity but also other security issues such as authorization and authentication. For public, anonymity of communications may be managed by ISP or by an independent third party.

In view of the absence of source and destination addresses in content packets carrying application data, an outside observer may concentrate on interception and analysis of announcement packets, which are IP packets transmitted to and from the data exchange sever. The overall security can be improved by using public/private key encryption for protection not only the packet payload but also the packet source address as well. Note that IP routers, which forward packets according to the connectionless protocol, need the destination address while the source address is typically used at the final destination by the connection-oriented TCP. In addition, dummy requests and notifications may be used in order to complicate the traffic analysis.

Similar to network addresses, flow numbers have to be globally unique but unlike the addresses, which are assigned once, the flow numbers are randomly generated and reusable. In the preferred embodiment, the 32-bits binary number (FIG. 3b) is divided in two equal parts: 16-bits prefix and 16-bits suffix. The prefixes are generated and distributed to VPNs by a global server, and suffixes are generated and assigned by VPN's data exchange server. On a daily basis, the global server generates a succession of pseudo-randomly arranged different numbers in the range 1 to 2 and sends a file with a part of those numbers to each participating VPN for use as prefixes. Larger VPNs receive larger files with more prefixes. VPN's data exchange server runs its own pseudo-random generator to produce suffixes. Whenever a flow number is assigned, its suffix is placed into "in-use" list. After the flow transmission is completed, the suffix is removed from the list and can be assigned again to other flow. While this arrangement may be seen as complicated, it ensures that all flows of application data concurrently transmitted over the Internet have randomly chosen but different flow numbers.

Although the invention is described herein with reference to the preferred embodiment, it is to be understood that modifications can be made by those skilled in the art without departing from the spirit or scope of the invention. Accordingly, the invention should only be limited by the claims included below.

I claim:

1. A system for concealing from an outside observer a source and destination of information transmitted over interconnected networks comprising:

a plurality of hosts connected to the interconnected networks and enabled to send and receive two types of data defined as application data and auxiliary data used for delivery of said application data, wherein said auxiliary data is encapsulated into announcement packets, which are conventional IP packets with source and destination addresses included in a packet header, and said application data is encapsulated into content packets; wherein a content packet header contains a flow number assigned to a flow application data and does not contain a data source and destination address;

a plurality of conventional IP routers on the interconnected networks for forwarding the announcement packets;

a plurality of flow routers on the interconnected networks for forwarding the content packets; and a trusted server operative for receiving a request from a source host or a destination host for delivery of specific application data from the source host to the destination host, choosing a path from the source host to the destination host over a sequence of said flow routers, assigning a flow number to a flow of said specific application data to be delivered and sending notifications specifying the flow number to the source host, the destination host and each said flow router along the chosen path;

wherein the request for said specific application data and all said notifications are encapsulated into said announcement packets and forwarded to their destinations by the conventional IP routers, while said specific application data is encapsulated into said content packets with the assigned flow number and forwarded to said destinations by the flow routers;

wherein said specific application data is delivered over a virtual circuit that is both anonymous and congestion-free, because it does not reveal the data source and destination addresses, and the trusted server, which is a potential bottleneck for network traffic, is not a part of the virtual circuit;

wherein the notifications sent by the trusted server to the source and destination hosts are encrypted with individual public keys of the hosts so to conceal association of a particular flow number with a flow source and destination; and wherein a large flow of said content packets is divided into smaller parts and different flow numbers are assigned to the parts so that the parts would look like flows of different application data, thereby making it harder for an outside observer to trace the path of said application data.

2. The system of claim 1 wherein the notifications sent by the trusted server to the flow routers are encrypted with individual public keys of the flow routers so to make it harder for an outside observer to trace the path of said application data.

3. The system of claim 1 wherein said request for delivery of application data sent to the trusted server from said source host or said destination host is encrypted with an individual public key of the trusted server thereby making it harder for an outside observer to trace the path of said application data.

4. The system of claim 1 wherein the flow number in the packet header is changed by said flow routers, so that a content packet traveling along the chosen path would look as if it belongs to different flows of said application data, thereby making it harder for an outside observer to trace the path of said application data.

5. The system of claim 1 wherein the notifications sent by the trusted server to the source and destination hosts contain, along with a flow number, a single-transmission key for encrypting said application data at the source and decrypting the data at the destination, thereby improving network security.

6. The system of claim 1 wherein the trusted server stores authorization information for monitoring the requests for delivery of said specific application data, thereby improving network security.

7. The system of claim 1 wherein the notifications sent by the trusted server to the flow routers contain, along with a said flow number, a flow priority, thereby providing quality of service through traffic prioritization.

* * * * *